No. 731,348. PATENTED JUNE 16, 1903.
C. G. ESHELMAN.
HOSE COUPLING FOR PNEUMATIC TIRES.
APPLICATION FILED MAR. 6, 1902.
NO MODEL.
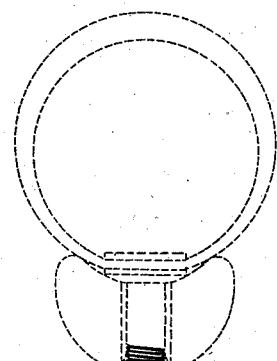
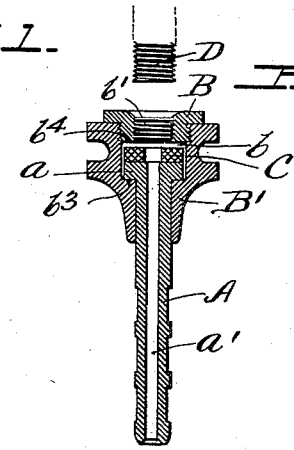

No. 731,348.

Patented June 16, 1903.

UNITED STATES PATENT OFFICE.

CHARLES G. ESHELMAN, OF READING, PENNSYLVANIA, ASSIGNOR OF ONE-HALF TO EDWIN S. YOUSE, OF READING, PENNSYLVANIA.

HOSE-COUPLING FOR PNEUMATIC TIRES.

SPECIFICATION forming part of Letters Patent No. 731,348, dated June 16, 1903.

Application filed March 6, 1902. Serial No. 96,874. (No model.)

*To all whom it may concern:*

Be it known that I, CHARLES G. ESHELMAN, a citizen of the United States of America, and a resident of Reading, in the county of Berks and State of Pennsylvania, have invented certain new and useful Improvements in Hose-Couplings for Pneumatic Tires, of which the following is a specification.

My invention relates to an improved coupling designed particularly for connecting an air-pump to the air-valve of a pneumatic tire for the purpose of inflating the latter.

The invention consists in providing a two-part sleeve adapted to engage and draw together the flanged end of the air-barrel and the screw-threaded stem of the air-valve against an interposed joint-washer, which is normally held loosely in a chamber provided therefor in said two-part sleeve, as is fully described in connection with the accompanying drawings and particularly pointed out in the claim.

Figures 1 and 2 are similar longitudinal section views of two slightly-different embodiments of my invention.

A represents the air-barrel, to which the pump-hose is connected and which is formed with the flange or collar $a$ and a small bore $a'$, extending its full length. The coupling-sleeve is formed in two sections, which are screwed together rigidly, so as to form when in use a single piece loosely inclosing and projecting beyond the flanged end of the air-barrel and provided with an inner chamber $b$ to receive loosely both said flanged end and a washer C and with a central screw-threaded opening $b'$ to said chamber $b$ of greater diameter than the bore $a'$ of the air-barrel. The opening in the washer C is smaller than said opening $b'$ and corresponds with this bore $a'$ of the barrel, and the washer is loosely located in the chamber $b$, formed by the union of the two parts of the sleeve, so that the latter may be turned as a whole upon the air-barrel independently of the washer. This movement of the sleeve is required in effecting the coupling with the stem D of the air-valve, which latter may be of any ordinary type, screw-threaded exteriorly to engage the screw-threaded opening $b'$ of the sleeve. As the sleeve is thus screwed upon the valve-stem D the end of the latter is forcibly seated against the washer around the central perforation in the latter, thus pressing the washer against the flanged end of the air-barrel and insuring a perfectly tight joint between the latter and the stem of the air-valve.

In the construction shown in Fig. 1 the washer-chamber is formed in the cap part or section B of the sleeve, which extends over the flanged end $a$ of the air-barrel and is screwed upon the other section B', which latter incloses the body of the air-barrel below the flange $a$, and is firmly seated against a shoulder $b^2$ on said section B', so as to rigidly unite the two sections, while in Fig. 2 the arrangement is merely reversed, the section B' being extended beyond the flanged end of the air-barrel, so as to form the washer-chamber $b$, and being screwed upon the section B to rigidly unite the two. In either case the results are the same, the former construction, however, permitting the screw-threaded opening $b'$ to be reduced in length, so as to enable the union to be properly made to a very short valve-stem and with fewer turns of the sleeve. In either case the chamber $b$ is provided with an interior shoulder $b^3$ to engage the flange $a$ of the air-barrel and with a similar shoulder $b^4$, which limits the movement of the loose washer in said chamber $b$.

What I claim is—

As a new article of manufacture a hose-coupling for pneumatic tires comprising a coupling-sleeve of two rigidly-connected parts forming an interior chamber with shoulders $b^3$ and $b^4$, a flanged air-barrel having its flanged end located in said chamber and its body portion extending through an axial opening in one of the sleeve parts and a washer located in said chamber between the flange of the air-barrel and said shoulder $b^4$, the other sleeve part being provided with a screw-threaded opening of greater diameter than the opening in said washer, substantially as set forth.

Signed at Reading, Pennsylvania, this 1st day of March, 1902.

CHARLES G. ESHELMAN.

Witnesses:
D. M. STEWART,
W. G. STEWART.